United States Patent
Riall et al.

(10) Patent No.: US 9,810,924 B2
(45) Date of Patent: Nov. 7, 2017

(54) MULTI-PIECE INSERT DEVICE WITH LOCKING SEAL FOR OPHTHALMIC DEVICES

(71) Applicant: Johnson & Johnson Vision Care, Inc., Jacksonville, FL (US)

(72) Inventors: James Daniel Riall, Saint Johns, FL (US); Randall B. Pugh, St. Johns, FL (US); Daniel B. Otts, Fruit Cove, FL (US); Frederick A. Flitsch, New Windsor, NY (US); Adam Toner, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 154 days.

(21) Appl. No.: 14/134,887

(22) Filed: Dec. 19, 2013

(65) Prior Publication Data

US 2014/0192314 A1    Jul. 10, 2014

Related U.S. Application Data

(60) Provisional application No. 61/750,679, filed on Jan. 9, 2013.

(51) Int. Cl.
*G02C 11/00* (2006.01)
*G02C 7/08* (2006.01)
*B29D 11/00* (2006.01)

(52) U.S. Cl.
CPC ........ *G02C 11/10* (2013.01); *B29D 11/00807* (2013.01); *G02C 7/085* (2013.01)

(58) Field of Classification Search
CPC ........ G02C 7/02; G02C 11/10; G02C 13/001; G02C 1/10; B29D 11/00807

USPC .......................................................... 351/158
See application file for complete search history.

(56) References Cited

U.S. PATENT DOCUMENTS

| | | | |
|---|---|---|---|
| 3,673,055 A | 6/1972 | Sheld | |
| 4,340,282 A * | 7/1982 | Murakami | G02C 1/10 351/154 |
| 4,890,903 A * | 1/1990 | Treisman | G02B 3/14 359/666 |
| 5,229,885 A | 7/1993 | Quaglia | |
| 5,956,183 A * | 9/1999 | Epstein et al. | 359/666 |
| 8,441,737 B2 * | 5/2013 | Buch et al. | 359/665 |
| 2004/0084790 A1 | 5/2004 | Blum et al. | |
| 2005/0024888 A1 | 2/2005 | Otani et al. | |
| 2005/0185134 A1 | 8/2005 | Ocampo et al. | |
| 2009/0033863 A1 | 2/2009 | Blum et al. | |
| 2009/0244477 A1 | 10/2009 | Pugh et al. | |
| 2010/0078838 A1 | 4/2010 | Pugh et al. | |

(Continued)

FOREIGN PATENT DOCUMENTS

| | | |
|---|---|---|
| EP | 0470811 A2 | 2/1992 |
| EP | 2199836 A1 | 6/2010 |

(Continued)

OTHER PUBLICATIONS

EP Search Report for EP 14 15 048u5 dated Apr. 3, 2014.

*Primary Examiner* — Zachary Wilkes

(57) ABSTRACT

This invention discloses methods and apparatuses for sealing and encapsulating components on and within a multi-piece insert. In some embodiments, an ophthalmic lens is cast molded from a silicone hydrogel and the component includes a sealed and encapsulated multi-piece insert portion.

17 Claims, 9 Drawing Sheets

(56) References Cited

U.S. PATENT DOCUMENTS

2011/0157544 A1* 6/2011 Pugh ................ B29D 11/00125
  351/158
2011/0279905 A1* 11/2011 Pugh et al. ................... 359/665

FOREIGN PATENT DOCUMENTS

| WO | WO 9321010     | 10/1993 |
| WO | WO 0020168 A2  | 4/2000  |
| WO | WO 2005088388 A1 | 9/2005 |
| WO | WO 2011162958 A2 | 12/2011 |
| WO | WO 2012044589  | 4/2012  |

* cited by examiner

MULTI-PIECE INSERT DEVICE WITH LOCKING SEAL FOR OPHTHALMIC DEVICES

CROSS REFERENCE TO RELATED APPLICATIONS

This patent application claims the benefit of U.S. Provisional Patent Application No. 61/750,679, filed Jan. 9, 2013.

FIELD OF USE

The present invention relates to methods, apparatuses, and devices for sealing and encapsulating aspects related to ophthalmic devices and, more specifically, in some embodiments, the sealing and encapsulation aspects in the fabrication of an ophthalmic lens with a multi-piece insert within which or upon which are components.

BACKGROUND

Traditionally, an ophthalmic device, such as a contact lens or an intraocular lens, included a biocompatible device with a corrective, cosmetic, or therapeutic quality. A contact lens, for example, can provide one or more of vision-correcting functionality, cosmetic enhancement, and therapeutic effects. The physical characteristics of the ophthalmic lens provide each function. A design incorporating a refractive quality into an ophthalmic lens can provide a vision-corrective function. A pigment incorporated into the ophthalmic lens can provide a cosmetic enhancement. An active agent incorporated into an ophthalmic lens can provide a therapeutic functionality. Such physical characteristics may be accomplished without the ophthalmic lens entering into an energized state.

More recently, it has been theorized that active components may be incorporated into a contact lens. Some components can include semiconductor devices. Some examples have shown semiconductor devices embedded in a contact lens placed upon animal eyes. However, such devices lack a freestanding energizing mechanism. Although wires may extend from an ophthalmic lens to a battery to power such semiconductor devices and it has been theorized that the devices may be wirelessly powered, no mechanism for such wireless power has been available.

It is desirable therefore to have additional methods and apparatus conducive to the formation of ophthalmic lenses that are energized to an extent suitable for providing one or more functionality into an ophthalmic lens and controlling change in optical characteristic of an ophthalmic lens or other biomedical device. In the process of fabricating such ophthalmic and biomedical devices, there may be numerous components where the nature of the components' physical and chemical isolation, or lack thereof, may be important. Novel methods, devices, and apparatus relating to the sealing and encapsulation of various components in energized ophthalmic and biomedical devices are therefore important.

SUMMARY

Accordingly, the present invention includes innovations relating to the sealing and encapsulation of various components including, for example, inserts that can be energized and incorporated into an ophthalmic device. Examples of such ophthalmic devices may include, for example, a contact lens or an intraocular lens. From a more general perspective, numerous other energized biomedical devices may be relevant within the scope of the invention. In addition, methods and apparatus for forming an ophthalmic lens with a sealed or encapsulated multi-piece insert are presented. In some embodiments, the media in an energized state is capable of powering a component capable of drawing a current. Components may include a variable optic lens element, a semiconductor device, and an active or passive electronic device. These components may also include the ability to be activated by an external signal of various types. Some embodiments can also include a cast-molded silicone hydrogel contact lens with a rigid or formable energized insert contained within the ophthalmic lens in a biocompatible fashion.

The present invention therefore includes methods for the formation of an insert by sealing at least a front curve piece and a back curve piece together. The method may include steps for defining electrical interconnects and attaching devices to the interconnects and/or to the curve pieces. The devices that result from the processing using these methods are also included.

In some alternative embodiments, there may be a second back curve piece that is added to the previously mentioned two-piece insert. In these cases, the sealing of the various pieces may create multiple cavities. The method steps to include additional discrete pieces to inserts either in sequential processing or in parallel processing steps are consistent with the nature of the inventive art herein.

In some embodiments, inserts may contain electrical components. Some or all of these components may be included in the space that is internal to sealed cavities within the insert. Other embodiments may result from the placement of the electrical components in a location that is exterior to the formed cavities. In embodiments with exterior components, it may be useful to encapsulate the components in their own encapsulating material.

The cavities that are formed by the various embodiments may also contain fluids of various kinds. For example, in a liquid meniscus-type embodiment, a central cavity located at least in part in an optical zone of an ophthalmic insert may contain liquids related to the formation of ophthalmic lenses. In some embodiments, the liquid may be placed within the region that defines the cavity before or during the sealing process that defines the cavity. In other cases, the liquid may be added after the formation of a sealed cavity, for example, by injection of filling needles through one or more regions in either a back curve piece or front curve piece followed by the subsequent sealing of the resulting penetration in the back curve piece or front curve piece.

The methods of forming seals and the resulting sealing devices are important aspects of various embodiments. In some embodiments, the seals may include preformed materials that are formed into shapes consistent with the subsequent formation of sealed regions. In other embodiments, seals may be formed in place by the application of sealing agents upon a surface of one or both of the back curve piece and front curve pieces. In some of these embodiments, the applied sealing agent may be allowed to cure before the assembly of multiple pieces; in other cases, the uncured sealing material will be further processed to assemble multiple pieces.

In embodiments with either pre-cured sealing materials or uncured sealing materials, the two pieces that are sealed with these materials to each other may be held in place or pressed together to form the seal. In some embodiments, the surfaces that are pressed together to form a physical contact for the seal may be subsequently held in place by the placement of an adhesive material spanning the two pieces, which, after curing, permanently affixes the two surfaces in place and maintains the sealing aspect of the seal material between the two pieces.

In some alternative embodiments, the surfaces that are pressed together may activate a self-sealing mechanism. The self-sealing mechanism may lock or self-lock the two or more pieces together and maintain pressure on the sealing material, which in turn maintains the physical contact to form the seal integrity. Other mechanisms may include additional features in the sealing region such as, for example, grooves for the placement of sealing material and knife-edges in the surface topography to better enhance the performance of the sealing region.

The features that are attached upon either or both of the front curve piece and back curve piece may also have embodiments relating to their sealing or encapsulating. The conductive traces, energization elements, and/or the electronic components may have sealing or encapsulating material deposited in such a manner to span the entire trace, energization element, or component, therefore allowing for contact between the encapsulating and sealing material on either end and the front curve piece or back curve piece material.

The resulting multi-piece insert devices may be further processed to form ophthalmic devices and novel methods relating to the methods of these ophthalmic device formation. In some embodiments, an insert may be placed within a first mold part where a small amount of ophthalmic lens body forming material may be found. In other embodiments, this lens-forming mixture may include, for example, hydrogel-forming materials. Additional lens-forming mixture may be added before, during, or after a second mold part is moved into proximity to the first mold part. The movement of the second mold part in proximity to the first mold part may form a cavity in which the insert and lens-forming mixture may be molded into a composite ophthalmic lens with high quality optical surfaces. The insert that is embedded in this resulting ophthalmic device may have encapsulated components and/or components that reside in sealed regions. Additionally, the molded lens-forming mixture, which in some embodiments may surround the insert, may be considered an insert-encapsulating layer. The components within or upon the insert may include electronic traces, energization devices, electronic devices including, for example, integrated circuits, and active optic elements including, for example, liquid meniscus ophthalmic lenses.

DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE INVENTION

Figure 1:
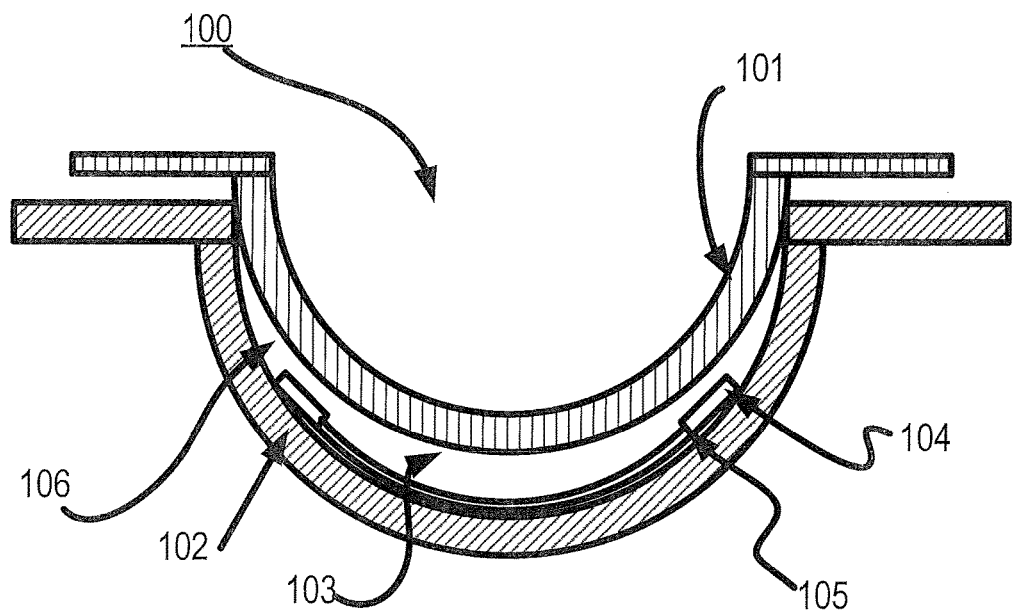
FIG. 1 illustrates exemplary mold assembly apparatus components that may be useful in implementing some exemplary embodiments of the present invention.

The present invention includes methods and apparatuses for manufacturing an ophthalmic lens with a multi-piece insert where portions of the insert and components comprising the insert may include aspects of sealing and encapsulation. In addition, the present invention includes an ophthalmic lens with a multi-piece insert incorporated into the ophthalmic lens including the aspects of sealing and encapsulation.

According to the present invention, an energized ophthalmic lens is formed with an embedded insert and an energy source, such as an electrochemical cell or battery as the storage means for the energy. In some exemplary embodiments, the materials comprising the energy source are encapsulated and isolated from an environment into which an ophthalmic lens is placed.

In some exemplary embodiments, a multi-piece insert also includes a pattern of circuitry, components, and energy sources. Various exemplary embodiments may include the multi-piece insert locating the pattern of circuitry, components, and energy sources around a periphery of an optical zone through which a wearer of an ophthalmic lens would see. Other exemplary embodiments may include a pattern of circuitry, components, and energy sources that are small enough to not adversely affect the sight of a contact lens wearer, and therefore the multi-piece insert may locate them within, or exterior to, an optical zone.

In general, according to some exemplary embodiments of the present invention, a multi-piece insert is integrated into an ophthalmic lens via automation that places an energy source in a desired location relative to a mold part used to fashion the ophthalmic lens. The exemplary embodiments that place the various components into the ophthalmic lens may employ one or more steps where components are sealed and adhered into place or where components are encapsulated.

In some exemplary embodiments, an energy source is placed in electrical communication with a component that may be activated on command and draws electrical current from the energy source included within the ophthalmic lens. A component may include a semiconductor device, an active or passive electrical device, or an electrically activated machine, including, for example, microelectromechanical systems (MEMS), nanoelectromechanical systems (NEMS), or micromachines. Subsequent to placing the energy source and component, the mold part may shape and polymerize a reactive mixture to form the ophthalmic lens.

In the following sections, detailed descriptions of embodiments of the invention will be given. The description of both preferred and alternative embodiments are exemplary embodiments only, and it is understood that to those skilled in the art that variations, modifications, and alterations may be apparent. It is therefore to be understood that the exemplary embodiments do not limit the scope of the underlying invention.

Glossary

In this description and claims directed to the presented invention, various terms may be used for which the following definitions will apply:

Back Curve Piece: as used herein refers to a solid element of a multi-piece insert that, when assembled into the insert, will occupy a location on the side of the ophthalmic lens that is on the back. In an ophthalmic device, such a piece would be located on the side of the insert that would be closer to the wearer's eye surface. In some exemplary embodiments, the back curve piece may include a region in the center of an ophthalmic device through which light may proceed into the wearer's eye. This region may be called an optical zone. In other exemplary embodiments, the piece may take an annular shape where it does not include some or all of the regions in an optical zone. In some embodiments of an ophthalmic insert, there may be multiple back curve pieces, and one of them may include the optical zone, while others may be annular or portions of an annulus.

Component: as used herein refers to a device capable of drawing electrical current from an energy source to perform one or more of a change of logical state or physical state.

Energized: as used herein refers to the state of being able to supply electrical current to or to have electrical energy stored within.

Energy: as used herein refers to the capacity of a physical system to do work. Many uses within the present invention may relate to the capacity being able to perform electrical actions in doing work.

Energy Source: as used herein refers to a device capable of supplying energy or placing a biomedical device in an energized state.

Energy Harvesters: as used herein refers to device capable of extracting energy from the environment and convert it to electrical energy.

Front Curve Piece: as used herein refers to a solid element of a multi-piece insert that, when assembled into the insert, will occupy a location on the side of the ophthalmic lens that is on the front. In an ophthalmic device, such a piece would be located on the side of the insert that would be further from the wearer's eye surface. In some exemplary embodiments, the piece may include a region in the center of an ophthalmic device through which light may proceed into the wearer's eye. This region may be called an optical zone. In other exemplary embodiments, the piece may take an annular shape where it does not include some or all of the regions in an optical zone. In some exemplary embodiments of an ophthalmic insert, there may be multiple front curve pieces, and one of them may include the optical zone, while others may be annular or portions of an annulus.

Lens-Forming Mixture or Reactive Mixture or Reactive Monomer Mixture (RMM): as used herein refers to a monomer or prepolymer material that may be cured and crosslinked or crosslinked to form an ophthalmic lens. Various exemplary embodiments may include lens-forming mixtures with one or more additives, for example, UV blockers, tints, photoinitiators or catalysts, and other additives useful in ophthalmic lenses such as contact or intraocular lenses.

Lens-Forming Surface: as used herein refers to a surface that is used to mold an ophthalmic lens. In some exemplary embodiments, any such surface may have an optical quality surface finish, which indicates that it is sufficiently smooth and formed so that an ophthalmic lens surface fashioned by the polymerization of an ophthalmic lens forming material in contact with the molding surface is optically acceptable. Further, in some exemplary embodiments, the lens-forming surface may have a geometry that is necessary to impart to the ophthalmic lens surface the desired optical characteristics, including spherical, aspherical and cylinder power, wave front aberration correction, corneal topography correction, or combinations thereof.

Lithium Ion Cell: as used herein refers to an electrochemical cell where lithium ions move through the cell to generate electrical energy. This electrochemical cell, typically called a battery, may be reenergized or recharged in its typical forms.

Multi-Piece Insert: as used herein refers to a formable or rigid substrate capable of supporting an energy source within an ophthalmic lens. In some exemplary embodiments, the multi-piece insert also supports one or more components.

Mold: as used herein refers to a rigid or semi-rigid object that may be used to form ophthalmic lenses from uncured formulations. Some preferred molds include two mold parts forming a front curve mold part and a back curve mold part.

Ophthalmic Lens or Lens: as used herein refers to any ophthalmic device that resides in or on the eye. These devices may provide optical correction or may be cosmetic. For example, the term ophthalmic lens may refer to a contact lens, intraocular lens, overlay lens, ocular insert, optical insert, or other similar device through which vision is corrected or modified, or through which eye physiology is cosmetically enhanced (changing appearance of iris color) without impeding vision. In some exemplary embodiments, the preferred ophthalmic lenses of the invention are soft contact lenses and made from silicone elastomers or hydrogels.

Optical Zone: as used herein refers to an area of an ophthalmic lens through which a wearer of the ophthalmic lens sees.

Power: as used herein refers to work done or energy transferred per unit of time.

Rechargeable or Reenergizable: as used herein refers to a capability of being restored to a state with higher capacity to do work. Many uses within the present invention may relate to the capability of being restored to a state with the ability to flow electrical current at a certain rate for a certain, reestablished time period.

Recharge or Reenergize: as used herein refers to an act of restoring to a state with higher capacity to do work. Many uses within the present invention may relate to restoring a device to a state with the capability to flow electrical current at a certain rate for a certain, reestablished time period.

Released from a Mold: as used herein refers to an act where an ophthalmic lens is either completely separated from the mold or is only loosely attached so that it may be removed with mild agitation or pushed off with a swab.

Stacked Integrated Component Devices (SIC-Devices): as used herein refers to the product of packaging technologies that may assemble thin layers of substrates, which may contain electrical and electromechanical devices, into operative integrated devices by means of stacking at least a portion of each layer upon each other. The layers may comprise component devices of various types, materials, shapes, and sizes. Furthermore, the layers may be made of various device-production technologies to fit and assume various contours.

Ophthalmic Lenses

Referring to FIG. 1, an apparatus 100 to form ophthalmic devices comprising sealed and encapsulated inserts is depicted. The apparatus includes an exemplary front curve mold 102 and a matching back curve mold 101. An insert 104 and a body 103 of the ophthalmic device may be located inside the front curve mold 102 and the back curve mold 101. In some exemplary embodiments, the material of the body 103 may be a hydrogel material, and the insert 104 may be surrounded on all surfaces by this material.

The insert 104 may be one of many different types of inserts. In FIG. 1, there may be at least one sealed surface 105 in the insert 104. Other exemplary embodiments may include different types of seals and encapsulations, some of which are discussed in later sections. The use of the apparatus 100 may create a novel ophthalmic device comprised of a combination of components with numerous sealed regions.

Figure 2:
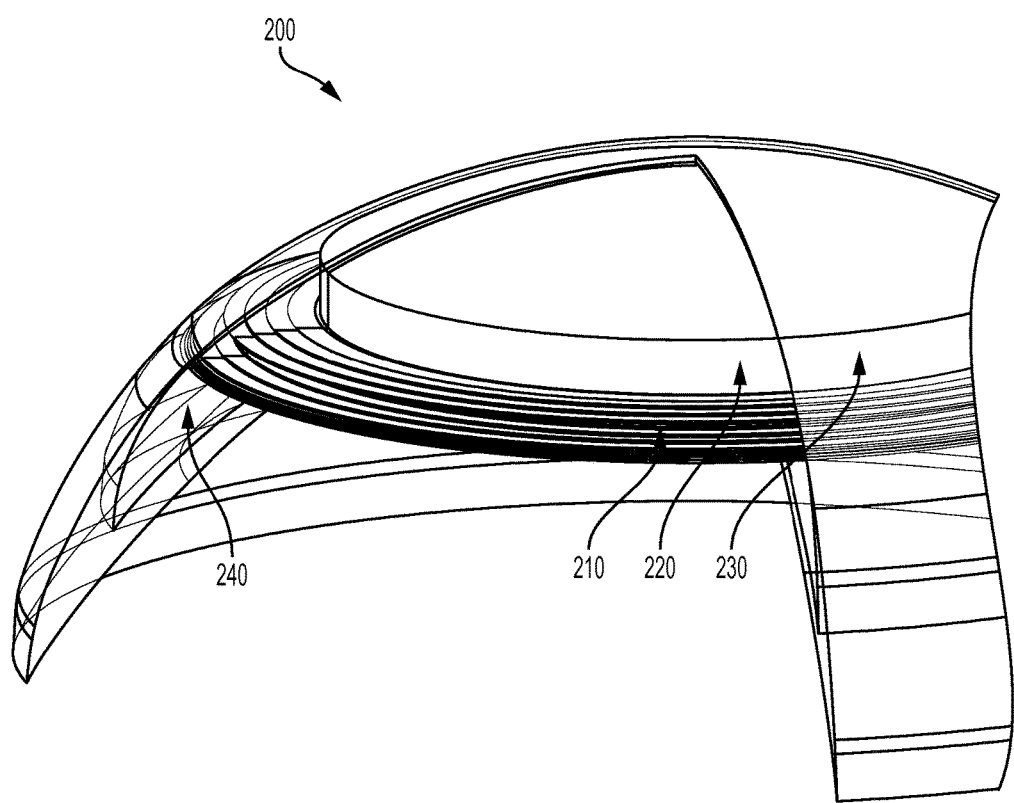
FIG. 2 illustrates an exemplary energized ophthalmic lens with a multi-piece insert embodiment.

Referring to FIG. 2, an exemplary embodiment 200 of the novel ophthalmic device is depicted in cross section. An ophthalmic device shell 230 may surround the embodiment 200. The shell 230 may be formed by the mold embodiment 100 depicted in FIG. 1 and may be comprised of numerous materials, including, for example, hydrogel compounds.

This exemplary embodiment 200 may also include an insert 240. In some exemplary embodiments, the insert 240 may be comprised of multiple pieces, and it may utilize seals of various kinds to assemble the insert 240.

This exemplary embodiment 200 may include a component device layer 210 that may include, for example, activation elements, processing elements, energization elements, and sensing elements. Numerous encapsulation schemes may be relevant to the inclusion of a component device layer 210. In some exemplary embodiments, the layers 210 may be adhered to other components, for example, an active optical device 220, before the resulting insert is then fixed into an ophthalmic device as depicted in FIG. 1. The active optical device 220 may be a liquid meniscus-type ophthalmic lens filled with two different immiscible fluids and then sealed.

Seals and Encapsulating Features—Glue Groove

Figure 3:
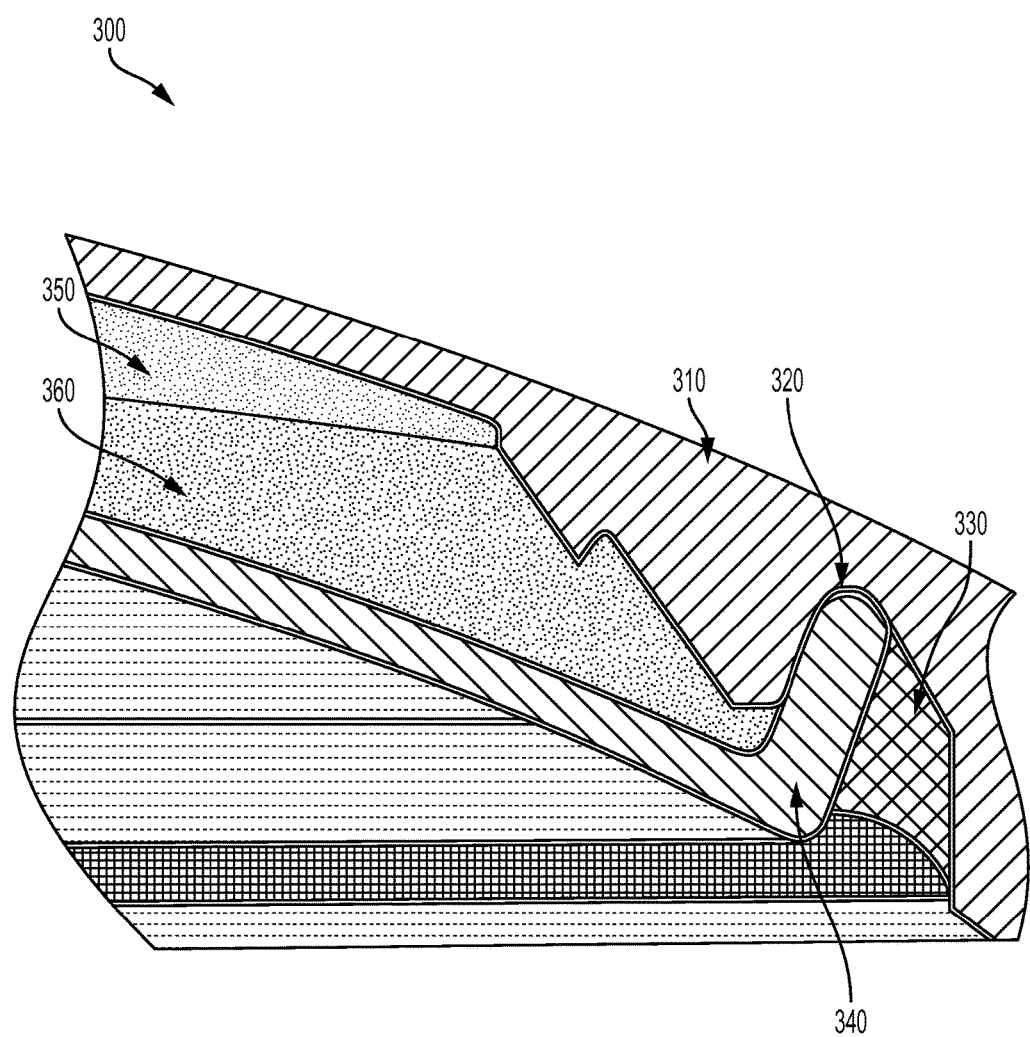
FIG. 3 illustrates a cross-sectional representation of an exemplary sealing embodiment for a multi-piece insert.

Referring now to FIG. 3, a magnified cross section of the edge 300 of an exemplary optical device 220 is shown. For example, the aqueous phase 360 and the nonaqueous phase 350 may represent the two immiscible fluids in a meniscus-type ophthalmic lens. The front surface 310 of the active device may be a molded separate piece onto which various electrode metal layers may have been deposited. The molded front curve piece 310 may have a glue groove, recess, or slot 320, which will then intersect with the molded, but separate, back curve piece 340. This glue groove 320 may serve as a receptacle for an adhesive, sealant, or glue, as examples. After the front curve piece 310 and the back curve piece 340 are brought into proximity to each other, either before or after the fluids 350 and 360 fill a cavity formed by the two pieces 310 and 340, the back curve piece 340 may be advanced to firmly register into the glue groove 320. Thereafter, an adhesive 330 may be deposited into the remaining space of the glue groove 320 to create a sealed region 330. In some exemplary embodiments, this glue groove 320 may be located around the entire periphery of the ophthalmic lens device itself.

Numerous methods may effectively apply adhesives into the glue groove 320. Some exemplary embodiments may include application by spray nozzles, as with, for example, printing equipment, or other exemplary embodiments may deposit into the glue groove 320 preformed adhesives, which are then either caused to flow and bond by heat light, pressure, or other standard means of forming seals and bonds. Many types of adhesives may form the sealed region 330. Table 1 lists some examples of the types of materials that may be utilized for this sealing application and possible respective embodiments. Table 1 also describes some representative characteristics of some materials in each of the categories. One ordinarily skilled in the art will recognize that materials other than those discussed may also be included within the scope of the claims.

TABLE 1

Partial Listing of exemplary sealing materials, encapsulating materials and coating materials

| Material | Exemplary aspects of utility |
|---|---|
| Epoxy Systems | One Component - high temp cure, excellent adhesive, biocompatible |
|  | Two Component - fast cure at ambient, biocompatibility, gap filling |
| Silicone Systems | One Component - resistance to humidity, high flexibility, Insulation, Optical Clarity |
|  | Two Component - Strength, Superior Flexibility, biocompatibility |
| UV Curable Systems | Fast Cure, grades with Flexibility, vapor free |
| LED Curable Systems | One Component, Low Temperature applications |
| Polyurethanes | Optical Clarity, Insulation, Flexibility |
| Polysulfides | Underwater cure, high Strength, high chem resistance |
| Cyanoacrylates | Biocompatibility, single compound, no outgassing |
| Elastomeric Systems | Excellent water resistance, Insulation, single compound |
| Film Adhesives | Preform-ability, excellent insulation characteristics |
| Hot Melt Systems | Food Contact Grades |
| Latex Systems | Pressure Sensitive Applications, Food Contact Grades |
| Polyimides | Photosensitive, Preform-ability, Flexibility |
| Parylenes (Vapor Phase Film Dep) | Surface Treatment, Insulation, Conformal Application |

Figure 4A:
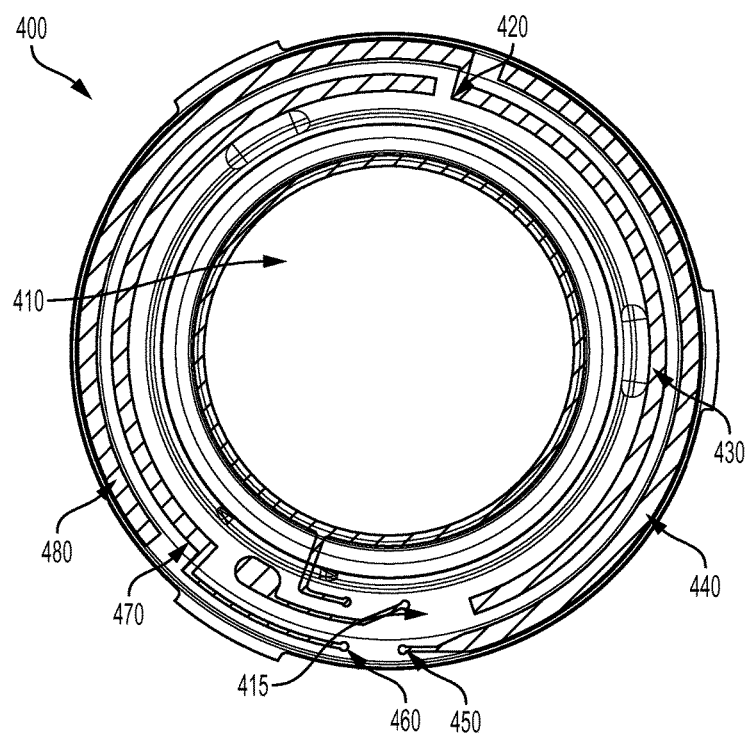
FIG. 4A illustrates a top down representation of an exemplary two-piece insert embodiment of a multi-piece insert.
Figure 4B:
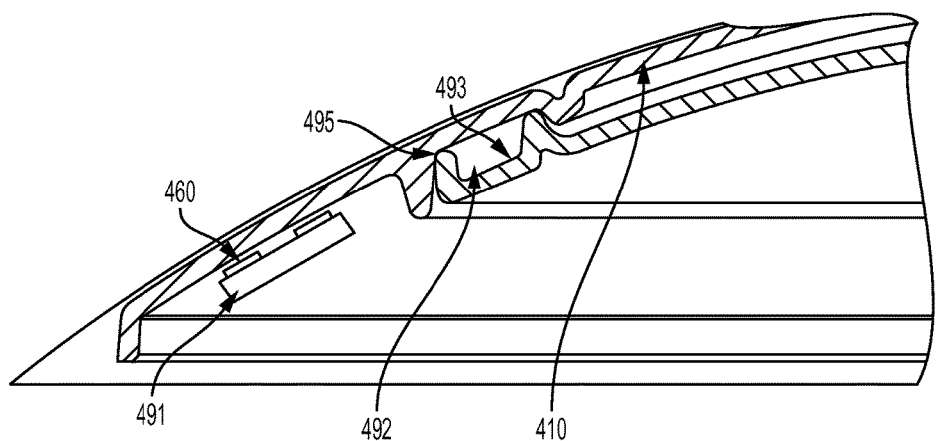
FIG. 4B illustrates a cross-sectional representation of an exemplary two-piece insert embodiment of a multi-piece insert.

FIGS. 4A and 4B illustrate a different embodiment 400 with a glue groove 495. This exemplary embodiment may be comprised of a two-piece assembly with a front curve piece 410 and back curve piece 492 with a cavity between the two pieces 410 and 492 used to house an active optical device, for example, a meniscus-type ophthalmic lens. The front curve piece 410 may be molded or formed to be larger than the size of the active optical element wherein the extra dimension creates a support area 415, which provides a mounting surface for components, interconnects, and eventually numerous types of sealing aspects. FIG. 4A illustrates an enlarged front curve piece 410 from top down.

Various electrical interconnects and interconnect features 430 and 440 may be located on this enlarged front curve piece 410. In some exemplary embodiments, these interconnect features 430 and 440 may connect to energization elements, for example, batteries. In other exemplary embodiments, the energization elements may be deposited or attached upon the electrical interconnects along the interconnect lines 430, 440, 470 and 480. In some specific exemplary embodiments, a first interconnect may be attached to a second interconnect 480 via a crossover 420. Connection points 450 and 460 may be used to interconnect the energization elements to other elements.

Elements may be formed from materials that may or may not be stable in the environments that ophthalmic devices occupy, including, for example, the tear fluid on an ocular surface that contacts the element. The use may include forming encapsulation layers from coatings, including, for example, a parylene family including the parylene C, N, and D family elements. In some embodiments, the encapsulation coating may occur before or after application of other adhesive or sealant layers.

FIG. 4B represents a direction of cross section to form the lower cross section image in the figure. As mentioned above, some exemplary embodiments include interconnect features, for example, a connection point, where components 491 are attached. An exemplary component 491 may include, for example, an integrated circuit attached to the connection point 460 by conductive epoxy as an example of a conductive material. In some exemplary embodiments, the attached components 491 may typically be adhered to a support area 415 of the front curve piece 410 via the under-filling of adhesive underneath, or in between, the component body and the attaching surface. Coatings or adhesives may also subsequently be applied to the integrated circuit or other component 491 to encapsulate it and connect it to the front curve piece 410. As shown in the cross section image, there may be a back curve feature 493. The nature of the seal designs that derive from an embodiment 490 with this back curve feature 493 will be discussed in the following sections in some detail.

Figure 5:
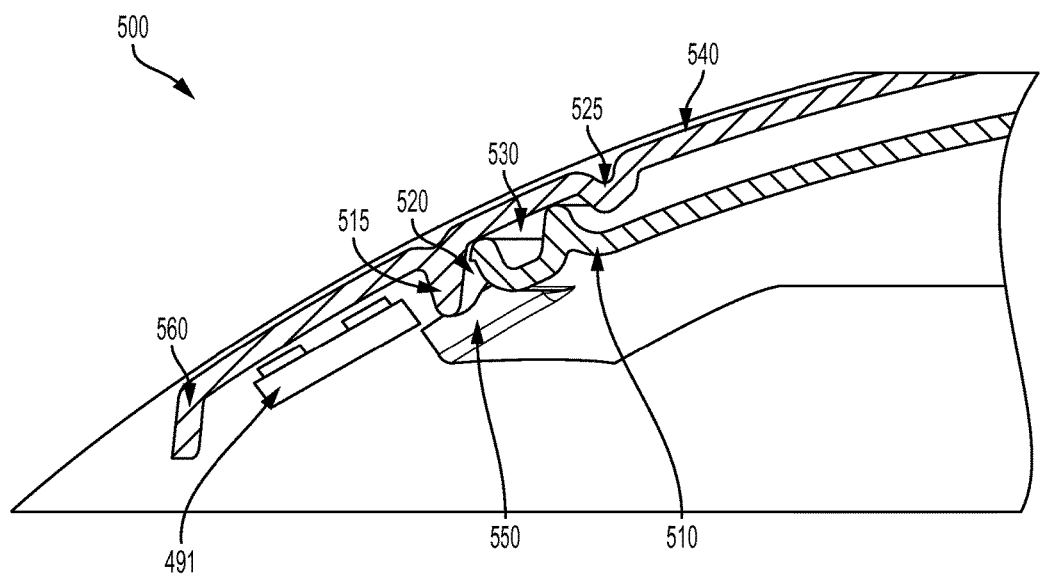
FIG. 5 illustrates an alternative exemplary embodiment of the multi-piece insert sealing region of the exemplary device in FIG. 4B.

Referring to FIG. 5, this exemplary embodiment 500 includes exemplary sealing features of the two-piece insert embodiments in FIGS. 4A and 4B. A front curve piece 540 of a multi-piece insert, in some embodiments, as in the one shown, may contain a molded or formed feature 525 that may serve the dual purpose of defining one side of a glue seal region 520 and providing a surface upon which electrodes may be deposited for various purposes. In some exemplary embodiments, like that shown, the front curve piece 540 may include a protrusion 515 to serve as an opposite side of a glue seal region 520. The back curve piece 510 of the multi-piece insert may have a molded feature that forms the mating surface for the glue seal region 515. In this exemplary embodiment, the back curve piece 510 has a two-feature mating surface, which then defines an interior cavity region 530 and an exterior region 520 of the resulting glue seal.

In some exemplary embodiments, the glue seal regions 525 and 515 may be filled with an adhesive before the back curve piece 510 is located into place, causing the adhesive to flow around the two sealing regions 520 and 530. Alternatively, the glue seal region 530 may be filled before the back curve piece 510 is moved into place against the front curve piece 540, allowing the adhesive to flow around the cavity forming both a seal and a bond. In some exemplary embodiments, the glue seal region 520 may be filled with an adhesive in a separate step that may include the same or different material from the first cavity filling step. The various materials of Table 1 may be used in the embodiments 500. This includes the use of adhesives to function under aqueous conditions or the use of relatively solid preformed sealants to fill the glue seal region 530.

In other exemplary embodiments, the sealing system 515, 520, 530, 525, 510 may be located closer to the outer edge 560 of the front curve piece 540. The minimum distance between the glue seal region 515 and the outer edge 560 still allows for the housing and support of a component 491, for example, integrated circuitry.

Other alternative exemplary embodiments may include a flap, extension, or appendage 550 that extends the back curve piece 510 to as far as the outer edge 560 of the front curve piece 540. This appendage 550 may serve a dual purpose of strengthening the glue seal region 520 and further protecting the component 491.

Figure 6:
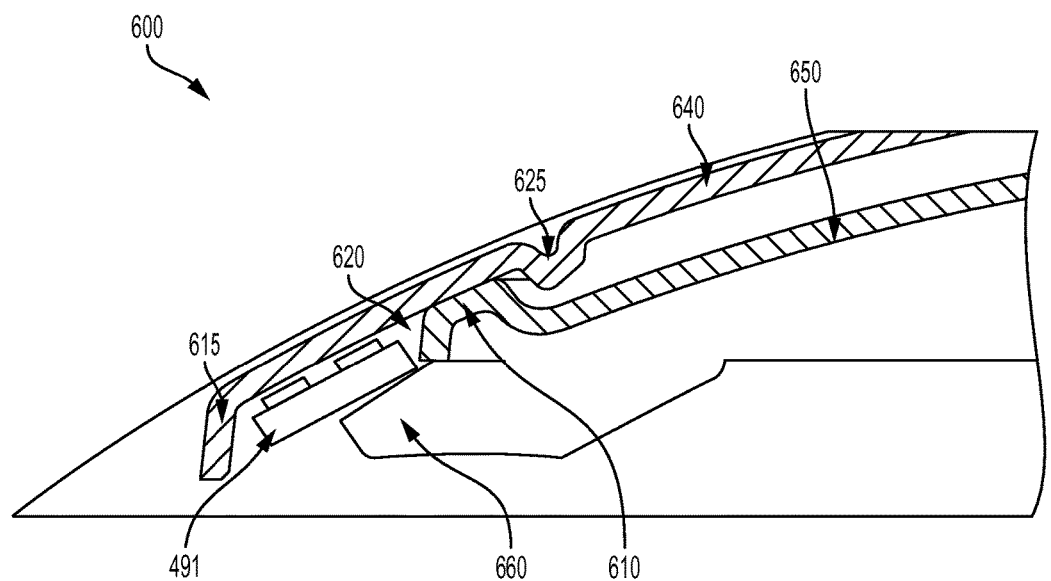
FIG. 6 illustrates an alternative exemplary embodiment of the multi-piece insert sealing region of the exemplary device in FIG. 4B.

In FIG. 6, another exemplary embodiment 600 includes a front curve piece 640 of a multi-piece insert and a back curve piece 650. In this exemplary embodiment, the glue seal region may span the interior cavity 620 between the back curve piece 650 and the front curve piece 640 from a formed feature 625 to the outer edge 615 and may be modified to include the component 491, for example, interconnection and integrated circuitry. The formed feature 625 may have a dual purpose of defining a glue seal region 620 from 625 to 615 and providing mounting surface for formed electrodes.

In another alternative exemplary embodiment, the design of the back curve piece 650 feature 610 that resides in the glue seal region 620 from 625 to 615 may be a single feature 610. In this exemplary embodiment, the interior cavity 620 is formed by a flap feature 660 and a sealing feature 610 into the glue seal region 620 from 625 to 615. The materials of Table 1 provide examples of the materials that may be effective in sealing and encapsulation of the insert device. From a general perspective, it may be obvious to one skilled in the art that numerous embodiments of the glue seal regions and the front curve piece and back curve piece features may be practical, and such devices are well within the scope of the claims.

Seals and Encapsulating Features—Compression Seal

Figure 7:
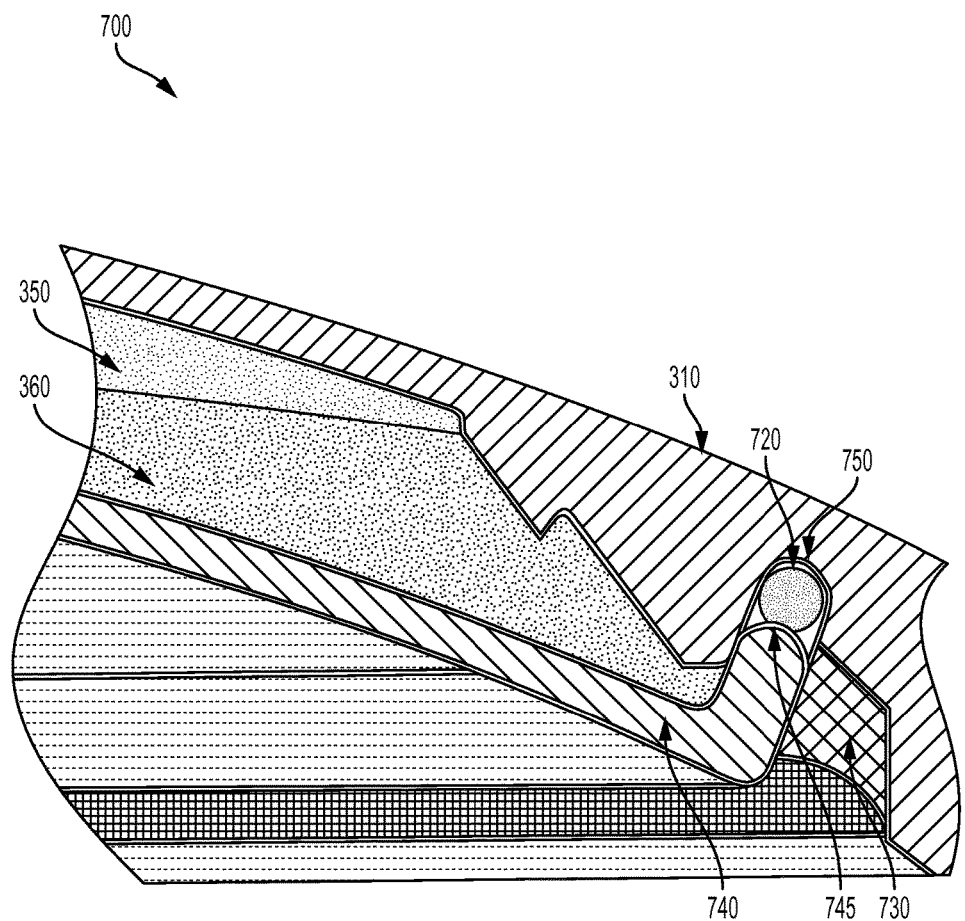
FIG. 7 illustrates an alternative exemplary embodiment of the sealing region in the exemplary device in FIG. 3.

FIG. 7 illustrates an alternate exemplary embodiment that includes a different type of seal system 745 and 720 that may seal a multi-piece insert device 700. In some exemplary embodiments, the nature of at least one of the seals may involve a compression seal between two surfaces. This embodiment 700 includes an exemplary back curve piece 740 with a surface 745 that compresses another sealing feature 720, which may be formed as a deposited seal from various adhesive materials, including, for example, the materials listed in Table 1.

In a specific embodiment, the sealing feature 720 may be an elastomeric o-ring that is placed into a groove 750 in the front curve piece 310, which creates a compressed location for the sealing features 720 and 745. When pressure is applied to the front curve piece 310 and the back curve piece 740, a compression seal may form between a sealing feature 745 on the back curve piece 740 and the sealing feature 720 in the groove 750. In some exemplary embodiments, an adhesive may be placed into the rest of the sealing groove 730 to lock the front curve piece 310 and the back curve piece 740 into the groove 750. In this exemplary embodiment, a compression-type seal in an ophthalmic device contains a fluid-based liquid meniscus embodiment; in other embodiments, this type of seal may be used for sealing needs in the ophthalmic lens environment, for example, the sealing system demonstrated in FIG. 6.

Seals and Encapsulating Features—Knife-Edge Seal

Figure 8:
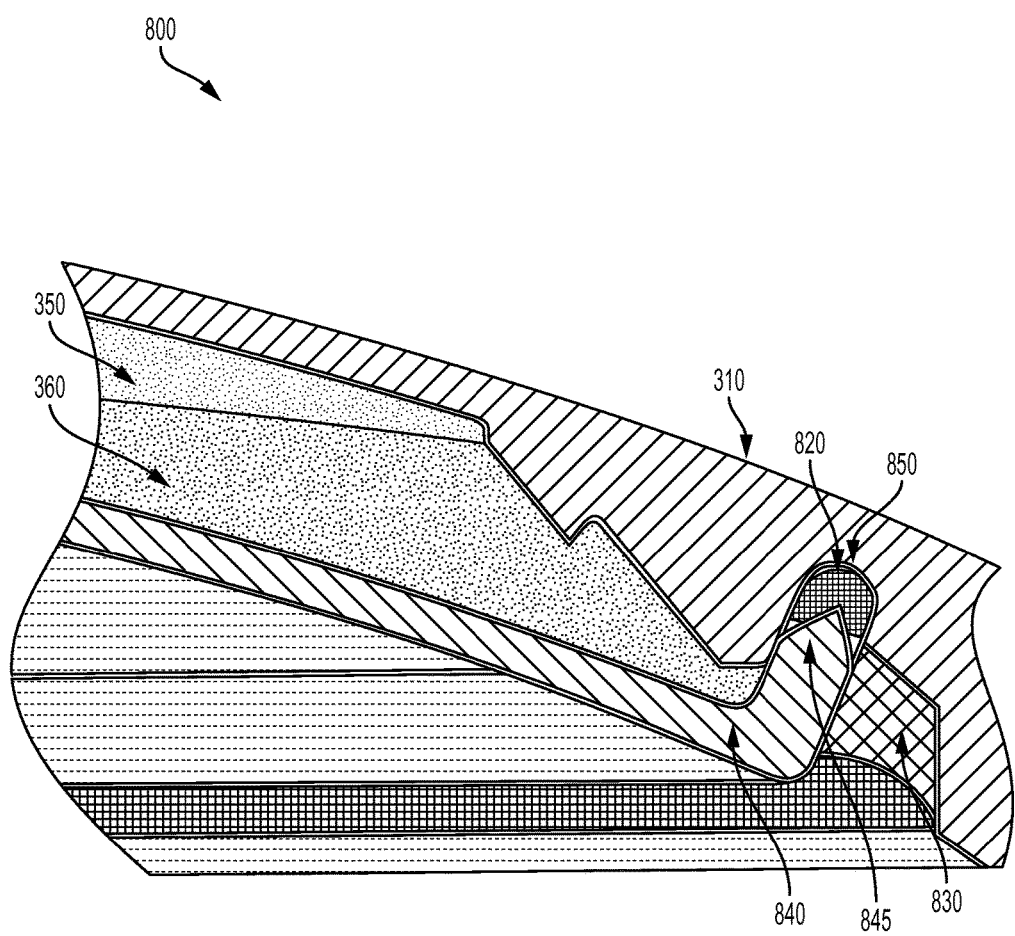
FIG. 8 illustrates an alternative exemplary embodiment of the sealing region in the exemplary device in FIG. 3.

FIG. 8 includes an alternative exemplary embodiment of a seal that may be formed to seal a multi-piece insert device 800. In said embodiments, the nature of at least one of the seals may involve a knife-edge seal 845 between a back curve piece 840 and a front curve piece 310. An exemplary back curve piece 840 may have a sharpened surface 845 that may lock into another sealing feature 820. In some exemplary embodiments, the sealing feature 820 may be formed as a deposited seal using, for example, the adhesive materials in Table 1. Other exemplary embodiments may include an O-ring type preformed feature 820 that may be placed into a groove 850 wherein the knife-edge feature 845 may be compressed into the sealing feature 820. Alternatively, an uncured or cured adhesive material may be applied to the groove 850 to create a sealing feature 820 into which the knife-edge feature 845 may be forced. In exemplary embodiments where the sealing feature 820 is uncured adhesive, the front curve piece 310 and the back curve piece 840 may be sealed and adhesively affixed by the surface formed by the knife-edge surface 845 into the sealing feature 820.

In other exemplary embodiments, regardless of the nature of the seal formed with the sealing feature 820, a subsequent exemplary step may include placing an adhesive into the rest of the sealing groove 830 to lock the front curve piece 310 and the back curve piece 840 into place. In this specific embodiment, the knife-edge sealing system 845, 820, and 850 in the ophthalmic device 800 is based on a fluid-based liquid meniscus embodiment. This type of sealing system 845, 820, and 850 could also be effective in other types of sealing needs in the ophthalmic lens environment, for example, the sealing of the type demonstrated in FIG. 6.

Figure 9:
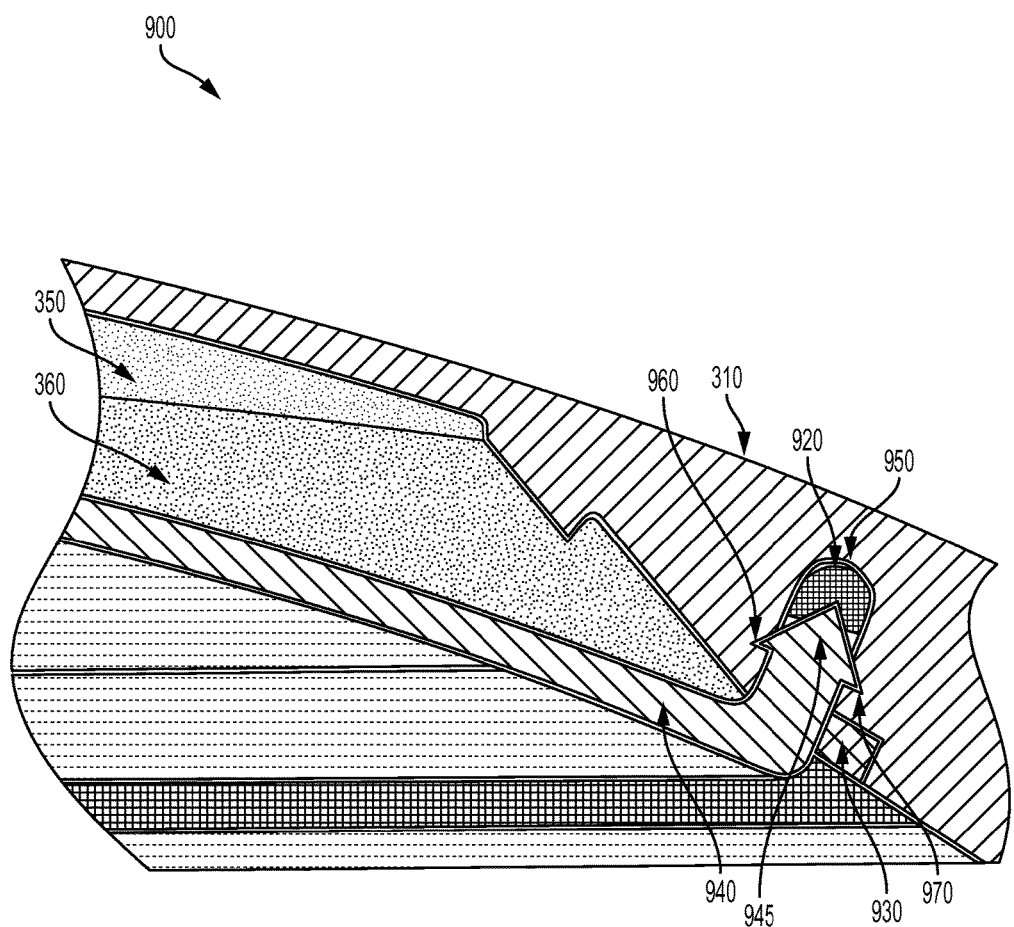
FIG. 9 illustrates an alternative exemplary embodiment of the sealing region in the exemplary device in FIG. 3.

FIG. 9 illustrates an alternative exemplary embodiment of a knife-edge type seal in an ophthalmic insert device 900. In this exemplary embodiment based around a fluid-based liquid meniscus embodiment, a front curve piece 310 of a multi-piece insert and a back curve piece 940 are locked together using a self-locking mechanism to seal and encapsulate the multi-piece insert device 900. A self-locking mechanism 960 utilizes a profile lip 970 extending from the knife-edge feature 945 on the back curve piece 940 and a slot groove 960 on the front curve piece 310. When the front curve piece 310 and the back curve piece 960 are pushed together, the profile lip 970 and the slot groove 960 create a positively locked junction. In the exemplary embodiment, the groove 950 may also create a compression location to further secure the knife-edge feature 945 into the sealing feature 920. It may be clear that any of the related sealing embodiments other than a knife-edge may constitute art within the inventive scope herein.

Another optional feature of this exemplary embodiment may include a recess 930 along the entire periphery of the self-locking sealing mechanism 960. The recess 930 may accept an adhesive or sealant, for example, the material listed in Table 1. This embodiment 900 depicts a single sealing location 950, but other embodiments may require multiple sealing locations. For example, in the device 400 in FIG. 4A, a self-locking sealing mechanism 960 may provide additional diversity of uses for the concepts embodied by the claims. A first sealing surface may be useful for sealing the fluid containing regions of the center of the ophthalmic lens, while a second annular ringed piece may be subsequently placed with an inner annular seal and an outer annular seal to enclose the interconnect, energization and electronic components. The back curve piece may be formed in such a manner to extend as one piece over all the regions. With multiple sealing surfaces for the different regions, the various sealing embodiments may be combined or used in multiple locations.

Methods and Materials for Insert-based Ophthalmic Lenses

Referring back to FIG. 1, a diagram of an exemplary mold device 100 for an ophthalmic lens is illustrated with a multi-piece insert 104. As used herein, a mold device 100 includes a plastic formed to shape a cavity 106 into which a lens-forming mixture may be dispensed such that upon reaction or cure of the lens-forming mixture, an ophthalmic lens of a desired shape is produced. The molds and mold assemblies 100 of the present invention are comprised of more than one mold parts or mold pieces 101 and 102. The mold parts 101 and 102 may be brought together in a manner that forms a cavity 106 between the mold parts 101 and 102 in which an ophthalmic lens may be formed. This combination of mold parts 101 and 102 is preferably temporary. Upon formation of the ophthalmic lens, the mold parts 101 and 102 may again be separated for removal of the ophthalmic lens.

At least one mold part 101 and 102 has at least a portion of its surface in contact with the lens-forming mixture so that upon reaction or cure of the lens-forming mixture the surface provides a desired shape and form to the portion of the ophthalmic lens with which it is in contact. The same is true of at least one other mold part 101 and 102.

Thus, for example, in an exemplary embodiment a mold device 100 is formed from two parts 101 and 102, a female concave piece (front curve mold) 102 and a male convex piece (back curve mold) 101 with a cavity 106 formed between them. The portion of the concave surface that makes contact with a lens-forming mixture has the curvature of the front curve of an ophthalmic lens to be produced in the mold device 100. The portion is sufficiently smooth and formed such that the surface of an ophthalmic lens, formed by polymerization of the lens-forming mixture that is in contact with the concave surface, is optically acceptable.

In some exemplary embodiments, the front curve mold 102 may also have an annular flange integral to and surrounding a circular circumferential edge that extends from the front curve mold 102 in a plane normal to the axis and also extends from the flange (not shown).

A lens-forming surface may include a surface with an optical-quality surface finish, which indicates that it is sufficiently smooth and formed so that an ophthalmic lens surface fashioned by the polymerization of a lens-forming mixture in contact with the molding surface is optically acceptable. Further, in some exemplary embodiments, the lens-forming surfaces of mold pieces 101 and 102 may have a geometry that is necessary to impart to the ophthalmic lens surface the desired optical characteristics, including spherical, aspherical, and cylinder power; wave front aberration correction; corneal topography correction; and combinations thereof. One ordinarily skilled in the art will recognize that characteristics other than those discussed may also be included within the scope of the invention.

An energy source and a component are mounted on a multi-piece insert 104, which may be comprised of any receiving material onto which an energy source may be placed. In some exemplary embodiments, the multi-piece insert 104 may also include, for example, circuit paths, components, and other aspects useful to placing the energy source in electrical communication with the component and enabling the component to draw an electrical current from the energy source. The novel sealing and encapsulating innovations discussed herein, for example, a sealed surface 105, allow for a functional insert to be manufactured in multiple pieces and then reliably assembled and sealed for eventual inclusion into an ophthalmic device, wherein materials in the ambient of the ophthalmic device and materials inside the insert device cannot diffuse through the insert materials or said seals 105.

Various exemplary embodiments also include placing an energy source into a multi-piece insert 104 prior to placing the multi-piece insert 104 into a mold portion used to form an ophthalmic lens. The multi-piece insert 104 may also include one or more components that will receive an electrical charge via the energy source.

In some exemplary embodiments, an ophthalmic lens with a multi-piece insert 104 may include a rigid center, soft skirt design wherein a central rigid optical element is in direct contact with the atmosphere and the corneal surface on respective anterior and posterior surfaces. The soft skirt of ophthalmic lens material (typically a hydrogel material) is attached to a periphery of the rigid optical element, which also acts as a multi-piece insert providing energy and functionality to the resulting ophthalmic lens. In these exemplary embodiments, the function of encapsulants and seals 105 are important.

Some additional exemplary embodiments include a multi-piece insert 104 that is a rigid ophthalmic lens insert and fully encapsulated within a hydrogel matrix. A multi-piece insert 104 that is a rigid ophthalmic lens insert may be manufactured, for example, using microinjection molding technology. Embodiments may include a poly(4-methyl-pent-1-ene) copolymer resin with a diameter of between about 6 mm to 10 mm and a front surface radius of between about 6 mm and 10 mm and a rear surface radius of between about 6 mm and 10 mm and a center thickness of between about 0.050 mm and 0.5 mm. Some exemplary embodiments include an insert with diameter of about 8.9 mm and a front surface radius of about 7.9 mm and a rear surface radius of about 7.8 mm and a center thickness of about 0.100 mm and an edge profile of about 0.050 radius. One exemplary micromolding machine can include the Microsystem 50 five-ton system offered by Battenfield Inc. Some or all of the sealing features, including grooves, slots, lips, and knife edges may be formed during the molding process or formed later by subsequent processing of the result of the molding process.

The multi-piece insert may be placed in a mold part 101 and 102 utilized to form an ophthalmic lens. Mold part 101 and 102 material may include, for example, a polyolefin of one or more of the following: polypropylene, polystyrene, polyethylene, polymethyl methacrylate, and modified polyolefins. Other molds may include a ceramic or metallic material.

Other mold materials that may be combined with one or more additives to form an ophthalmic lens mold include, for example, Zieglar-Natta polypropylene resins (sometimes referred to as znPP); a clarified random copolymer for clean molding as per FDA regulation 21 CFR (c) 3.2; a random copolymer (znPP) with ethylene group.

Still further, in some exemplary embodiments, the molds of the present invention may comprise polymers such as polypropylene, polyethylene, polystyrene, polymethyl methacrylate, modified polyolefins containing an alicyclic moiety in the main chain, and cyclic polyolefins. This blend may be used on either or both mold halves. Preferably, this blend is used on the back curve piece, and the front curve piece consists of the alicyclic co-polymers.

In some preferred methods of making molds 100 according to the present invention, injection molding is utilized according to known techniques. Embodiments may also include molds fashioned by other techniques including, for example, lathing, diamond turning, or laser cutting.

Typically, ophthalmic lenses are formed on at least one surface of both mold parts 101 and 102. However, in some exemplary embodiments, one surface of an ophthalmic lens may be formed from a mold part 101 and 102, and another surface of an ophthalmic lens may be formed, for example, using a lathing method.

In some exemplary embodiments, a multi-piece insert 400 may have a front curve surface 410 with an optical zone that includes a variable optic powered by an energy source located on the multi-piece insert 400. The multi-piece insert 400 may also include a component 491, for example, integrated circuitry, to control the variable optic included in the optical zone. In this discussion, a variable optic may be considered a component.

An energy source may be in electrical communication with a component 491. The component 491 may include any device that responds to an electrical charge with a change in state, for example, a semiconductor-type chip, a passive electrical device, or an optical device such as a crystal ophthalmic lens.

In some specific embodiments, an energy source includes, for example, battery or other electrochemical cell, capacitor, ultracapacitor, supercapacitor, or other storage component. Some specific embodiments may include a battery located on a multi-piece insert 400 on the periphery of an ophthalmic lens outside of the optical zone.

In some exemplary embodiments, an ophthalmic lens type may include an ophthalmic lens that includes a silicone-containing component. A silicone-containing component is one that contains at least one [—Si—O—] unit in a monomer, macromer, or prepolymer. Preferably, the total silicone and attached oxygen are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some exemplary embodiments, the ophthalmic lens skirt, also called an insert encapsulating layer, that surrounds the insert may be comprised of standard hydrogel ophthalmic lens formulations. Exemplary materials with characteristics that may provide an acceptable match to numerous insert materials may include, but are not limited to, the Narafilcon family (including Narafilcon A and Narafilcon B), and the Etafilcon family (including Etafilcon A). A more technically inclusive discussion follows on the nature of materials consistent with the art herein. One ordinarily skilled in the art may recognize that other material other than those discussed may also form an acceptable enclosure or partial enclosure of the sealed and encapsulated inserts and should be considered consistent and included within the scope of the claims.

Suitable silicone-containing components include compounds of Formula I

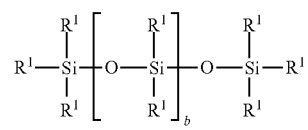

wherein $R^1$ is independently selected from monovalent reactive groups, monovalent alkyl groups, or monovalent aryl groups, any of which may further comprise functionality selected from hydroxy, amino, oxa, carboxy, alkyl carboxy, alkoxy, amido, carbamate, carbonate, halogen or combinations thereof; monovalent siloxane chains comprising 1-100 Si—O repeat units that may further comprise functionality selected from alkyl, hydroxy, amino, oxa, carboxy, alkyl carboxy, alkoxy, amido, carbamate, halogen, or combinations thereof;

where b is 0 to 500, where it is understood that when b is other than 0, b is a distribution having a mode equal to a stated value;

wherein at least one $R^1$ comprises a monovalent reactive group and, in some embodiments, between one and three $R^1$ comprise monovalent reactive groups.

As used herein, monovalent reactive groups are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl (meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates, and O-vinylcarbonates. Non-limiting examples of cationic reactive groups include vinyl ethers or epoxide groups and mixtures thereof. In one embodiment the free radical reactive groups comprise (meth)acrylate, acryloxy, (meth)acrylamide, and mixtures thereof.

Suitable monovalent alkyl and aryl groups include unsubstituted monovalent $C_{1-16}$alkyl groups, $C_{6-14}$ aryl groups, such as substituted and unsubstituted methyl, ethyl, propyl, butyl, 2-hydroxypropyl, propoxypropyl, polyethyleneoxypropyl, combinations thereof, and the like.

In one embodiment b is 0, one $R^1$ is a monovalent reactive group, and at least three $R^1$ are selected from monovalent alkyl groups having 1 to 16 carbon atoms or, in another embodiment, from monovalent alkyl groups having 1 to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl] propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane, and 3-methacryloxypropylpentamethyl disiloxane.

In another embodiment, b is 2 to 20, 3 to 15 or, in some embodiments, 3 to 10; at least one terminal $R^1$ comprises a monovalent reactive group and the remaining $R^1$ are selected from monovalent alkyl groups having 1 to 16 carbon atoms or, in another embodiment, from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms, and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), and monomethacryloxypropyl terminated mono-n-butyl terminated polydimethylsiloxanes (800-1000 MW) (mPDMS).

In another embodiment, b is 5 to 400 or from 10 to 300, both terminal $R^1$ comprise monovalent reactive groups, and the remaining $R^1$ are independently selected from monovalent alkyl groups having 1 to 18 carbon atoms, which may have ether linkages between carbon atoms and may further comprise halogen.

In one embodiment, where a silicone hydrogel ophthalmic lens is desired, the ophthalmic lens of the present invention will be made from a reactive mixture comprising at least approximately 20 and preferably between approximately 20 and 70 percent weight silicone-containing components based on total weight of reactive monomer components from which the polymer is made.

In another embodiment, one to four $R^1$ comprises a vinyl carbonate or carbamate of Formula II

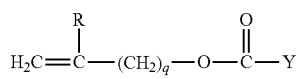

wherein Y denotes O—, S— or NH—; and R denotes hydrogen or methyl; d is 1, 2, 3, or 4; and q is 0 or 1.

The silicone-containing vinyl carbonate or vinyl carbamate monomers specifically include 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl]propyl allyl carbamate; 3-[tris (trimethylsiloxy)silyl]propyl vinyl carbamate; trimethylsilylethyl vinyl carbonate; trimethylsilylmethyl vinyl carbonate, and

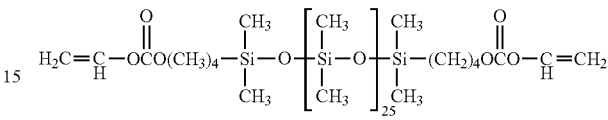

Where biomedical devices with modulus below approximately 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

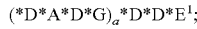

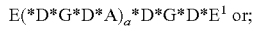

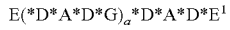   Formulae IV-VI wherein D denotes an alkyl diradical, an alkyl cycloalkyl diradical, a cycloalkyl diradical, an aryl diradical, or an alkylaryl diradical having 6 to 30 carbon atoms;

wherein G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

\* denotes a urethane or ureido linkage;

$a$ is at least 1; and

A denotes a divalent polymeric radical of formula:

Formula VII

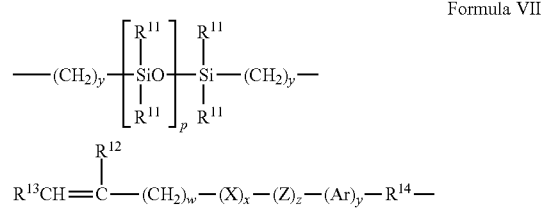

wherein $R^{11}$ independently denotes an alkyl or fluoro-substituted alkyl group having 1 to 10 carbon atoms, which may contain ether linkages between carbon atoms; y is at least 1; and p provides a moiety weight of 400 to 10,000;each of E and $E^1$ independently denotes a polymerizable unsaturated organic radical represented by Formula VIII wherein $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by Formula IX

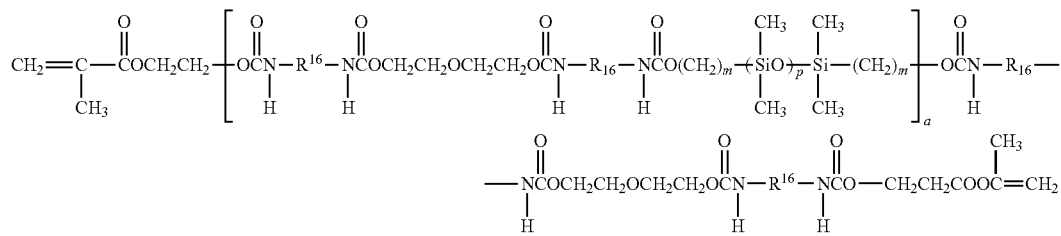

wherein $R^{16}$ is a diradical of a diisocyanate after removal of the isocyanate group, such as the diradical of isophorone diisocyanate. Another suitable silicone-containing macromer is a compound of formula X (in which x+y is a number in the range of 10 to 30) formed by the reaction of fluoroether, hydroxy-terminated polydimethylsiloxane, isophorone diisocyanate and isocyanatoethylmethacrylate.

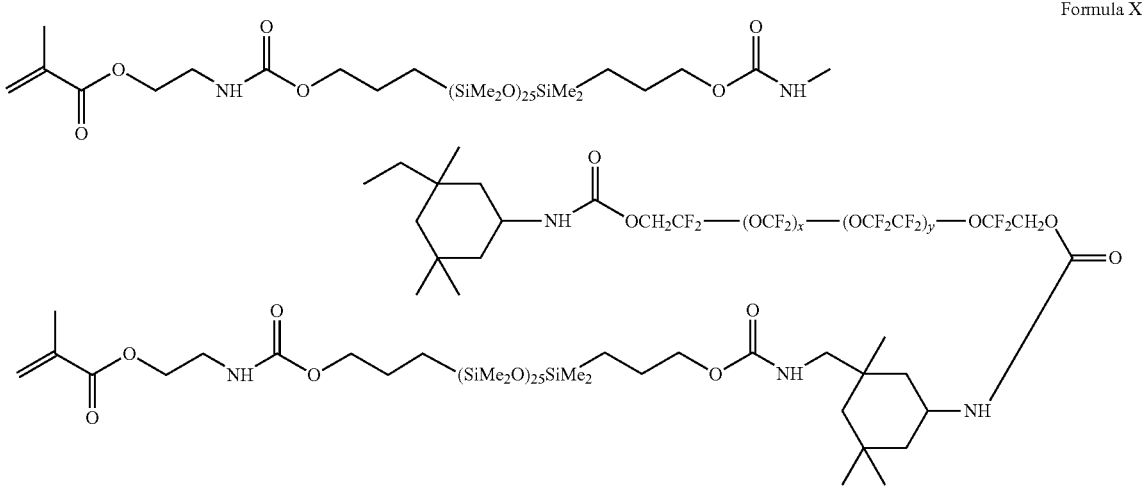

Formula X

Other silicone-containing components suitable for use in this invention include macromers containing polysiloxane, polyalkylene ether, diisocyanate, polyfluorinated hydrocarbon, polyfluorinated ether, and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes may also be used as the silicone-containing component in this invention.

The present invention, as described above and as further defined by the claims below, provides methods for sealing and encapsulating components within and upon multi-piece inserts and apparatus for implementing such methods, as well as ophthalmic lenses formed with the multi-piece inserts.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

The invention claimed is:

1. A multi-piece insert device for an ophthalmic lens comprising:
   an insert back curve piece;
   an insert front curve piece;
   a conductive material placed upon one or both of the insert front curve piece and the insert back curve piece;
   an electronic component attached at least in part to the conductive material;
   a self-locking feature including a groove on the insert front curve piece, a profile lip on the insert back curve piece configured to be pushed into the groove to fixedly hold the insert back curve piece in relative position to the insert front curve piece, thereby forming a cavity between the insert back curve piece and the insert front curve piece; and
   a sealing feature provided within the groove of the insert front curve piece and in contact with the profile lip to form a seal around the cavity;
   wherein the insertion of the profile lip into the groove compresses and maintains pressure on the sealing feature within the groove to form a seal around the cavity.

2. The device of claim 1, wherein the cavity contains the electronic component.

3. The device of claim 1, wherein the electronic component is exterior to the sealed cavity.

4. The device of claim 1, wherein the sealing feature is preformed into a pre-selected shape.

5. The device of claim 1, further comprising:
   a sealing material which forms an adhesive seal between at least a portion of both the insert front curve piece and the insert back curve piece;

wherein the adhesive seal maintains physical contact of the profile lip to the sealing feature.

6. The device of claim 1, further comprising:
a sealing agent on at least a portion of the electronic component.

7. The device of claim 1, further comprising:
a sealing agent on at least a portion of the conductive material.

8. The device of claim 1, further comprising:
a polymer layer encapsulating the device.

9. The device of claim 8, wherein the polymer layer comprises or forms a hydrogel.

10. The device of claim 9, further comprising:
an energization component.

11. The device of claim 10, further comprising:
a liquid meniscus ophthalmic lens element.

12. The device of claim 8, further comprising:
a liquid meniscus ophthalmic lens element.

13. The device of claim 1, further comprising:
at least a first liquid within the cavity.

14. The device of claim 1, wherein the sealing feature is an epoxy adhesive.

15. The device of claim 1, wherein the profile lip includes a tapered portion having sloped outer walls descending from an apex to form a lip member.

16. The device of claim 15, wherein the groove includes a slot groove portion configured to receivably engage the lip member such that when the profile lip is inserted into the groove, the lip member engages the slot groove to provide a locked engagement between the profile lip and the groove.

17. The device of claim 16, wherein the sealing feature is an O-ring disposed within the groove.

* * * * *